United States Patent [19]

Levine et al.

[11] Patent Number: 4,575,782
[45] Date of Patent: Mar. 11, 1986

[54] COLLISION AVOIDANCE LIGHT

[75] Inventors: Mark Levine, Plainview, N.Y.; Robert H. Hanes, Rochelle Park, N.J.; Joel Rudder, Rockaway, N.J.; David Ditlya, Fairlawn, N.J.

[73] Assignee: General Automotive Specialty Company, Inc., Brunswick, N.J.

[21] Appl. No.: 742,801

[22] Filed: Jun. 10, 1985

[51] Int. Cl.[4] .............................................. B60Q 1/00
[52] U.S. Cl. ..................................... 362/61; 362/368; 340/87
[58] Field of Search ....................... 362/61, 80, 82, 83, 362/368, 304, 309, 328, 329, 145; 340/67, 69, 87, 97, 815.32

[56] References Cited

U.S. PATENT DOCUMENTS

| 3,665,392 | 5/1972 | Annas | 340/815.32 |
| 3,905,017 | 9/1975 | Samra | 362/80 |
| 4,373,153 | 2/1983 | Sano et al. | 340/87 |
| 4,464,649 | 8/1984 | Her | 340/87 |
| 4,488,141 | 12/1984 | Ohlenforst | 340/87 |

OTHER PUBLICATIONS

J. C. Whitney & Co., Cat. #333, p. 40, 1974.

Primary Examiner—E. Rollins Cross
Attorney, Agent, or Firm—Darby & Darby

[57] ABSTRACT

A collision avoidance light for mounting at the rear window of an automobile includes a housing, a socket assembly, a lens and an anti-glare shield. The housing defines an open face. The socket assembly includes a socket for mounting a light bulb. The socket assembly is mounted on the housing. The lens is detachably mounted to the housing in juxtaposition with the open face. The anti-glare shield is mounted on the housing and at least partially surrounds the lens. The shield is readily adaptible to conform to the slope of the rear window.

5 Claims, 3 Drawing Figures

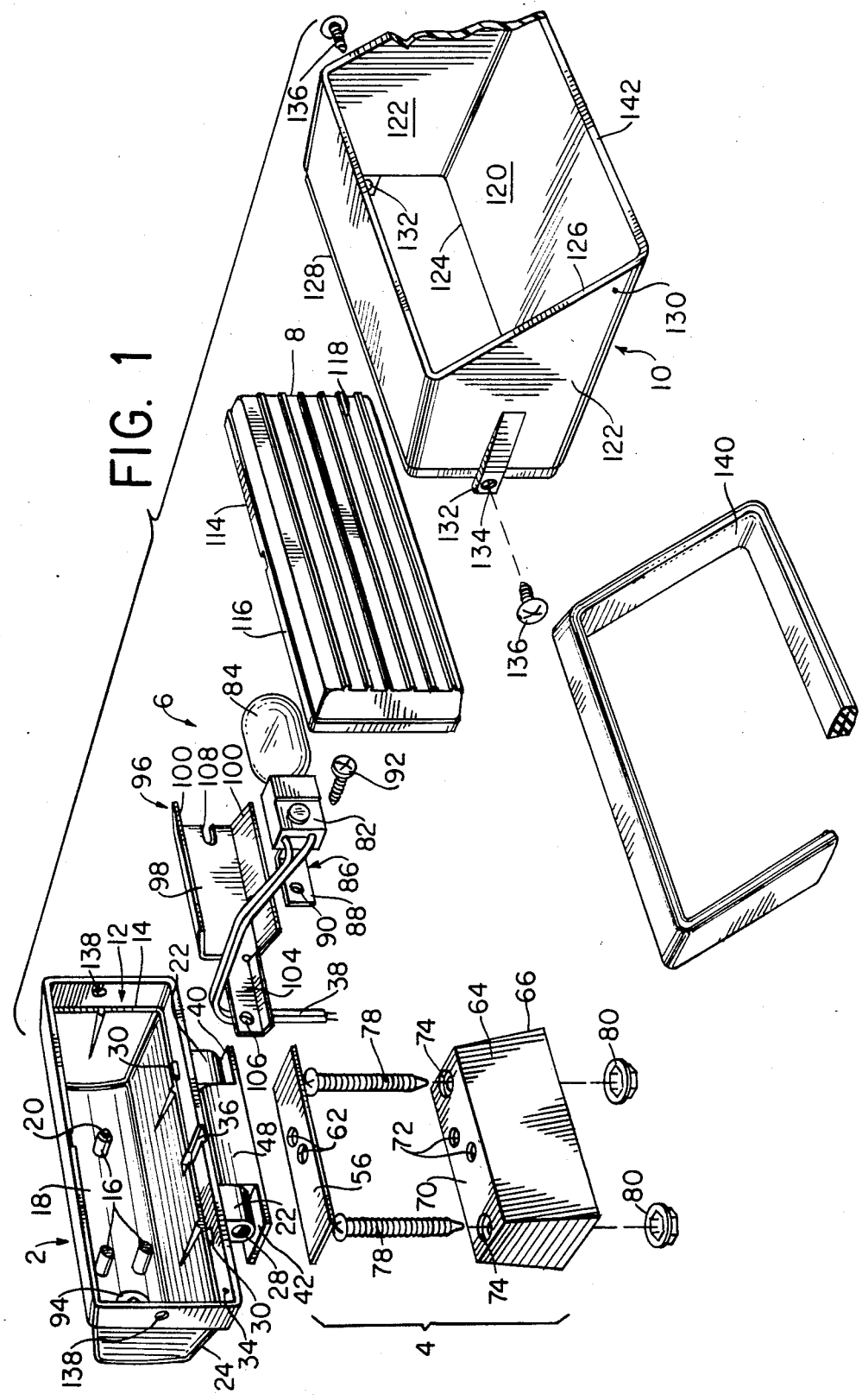

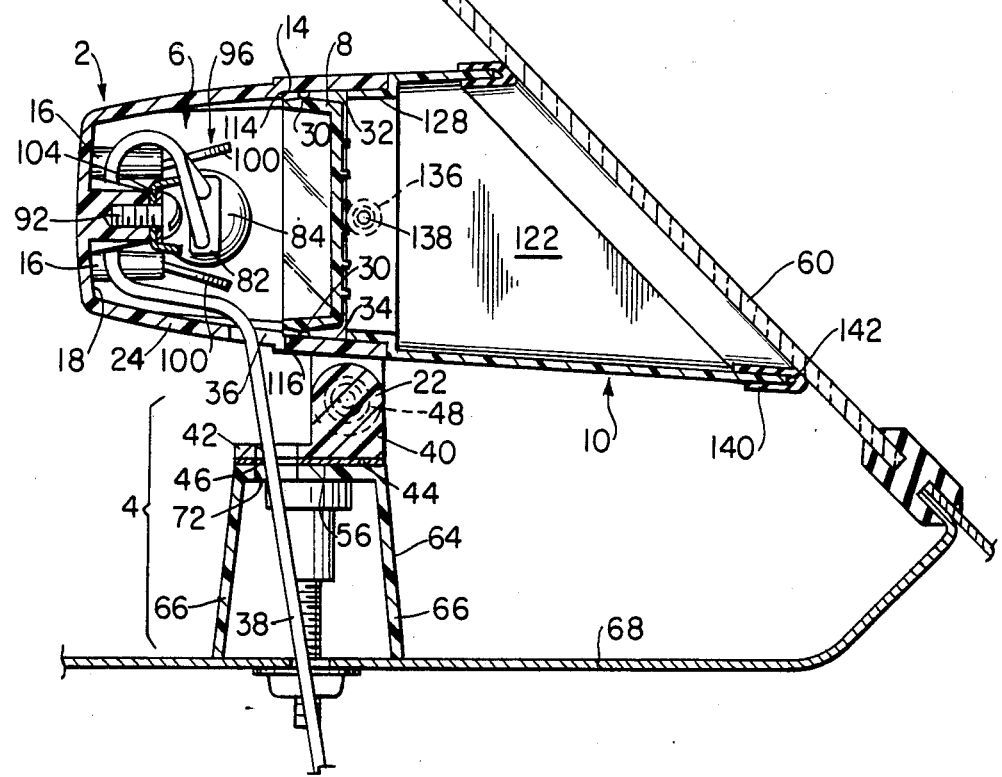
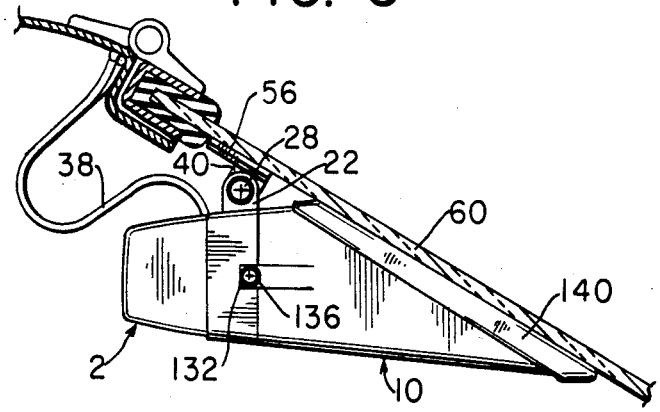

COLLISION AVOIDANCE LIGHT

BACKGROUND OF THE INVENTION

1. Field of the Invention

This invention relates generally to lamp enclosures, and more specifically to a collision avoidance light which is adapted to be mounted adjacent to the rear window of an automobile.

Studies by the U.S. Government and private industry over a period of six years and 100,000,000 miles have shown that a brake warning light mounted in the rear window of an automobile is likely to reduce automobile accidents involving rear-end collisions by as much as 53%. Federal laws now require that all new passenger cars sold after Sept. 1, 1985 include such a brake light. However, these laws do not affect the millions of vehicles now on the highways.

2. Description of the Prior Art

Brake and turn signal indicator lights adapted to be mounted in the rear window of an automobile have been widely used by police and government officials, and are available to consumers. These lights are usually mounted from the rear shelf of the automobile, or are adhesively secured to the rear window.

An inherent problem with conventional rear-window-mounted lights is the glare produced from the reflection of the light on the rear window. This glare can be disconcerting to the driver and may interfere with his rear view perception.

OBJECTS AND SUMMARY OF THE INVENTION

It is an object of the present invention to provide a rear-window-mounted collision avoidance light which overcomes the inherent problems of conventional rear-window-mounted-lights.

It is also an object of the present invention to provide a collision avoidance light which is relatively simple and inexpensive in construction, yet reliable and easy to manufacture.

In one particular embodiment of the present invention, a collision avoidance light includes a housing which defines an open face on one side thereof. A socket assembly, which includes a socket for replaceably mounting a light bulb therein, is mounted inside the housing. A lens is detachably secured to the housing in juxtaposition with the open face.

The collision avoidance light further includes an anti-glare shield secured to the housing and at least partially surrounding the lens.

In a preferred form of the invention, the anti-glare shield includes a main body which defines a first open face adjacent the lens and a second open face opposite the first face. The main body of the shield is shaped (or is adapted to be readily shaped) at the second open face to conform to the shape of the window of the automobile to allow the shield to be positioned closely thereto.

These and other embodiments, objects, features and advantages of this invention will be apparent in the following detailed description of illustrative embodiments thereof, which is to be read in connection with the accompanying drawing.

BRIEF DESCRIPTION OF THE DRAWING

FIG. 1 is an exploded, perspective view of a preferred form of the invention;

FIG. 2 is a sectional view of the embodiment illustrated by FIG. 1 and taken along the line 2—2 thereof; and FIG. 3 is a side elevational view illustrating a preferred form of the invention secured to the rear window of an automobile.

DETAILED DESCRIPTION OF THE PREFERRED EMBODIMENTS

A preferred form of the present invention will now be described in detail. Reference is initially made to FIG. 1 of the drawing.

A collision avoidance light constructed in accordance with the present invention includes a housing 2, a mounting assembly 4 for mounting the housing on an automobile, a socket assembly 6, a lens 8 and an anti-glare shield 10.

The housing 2 has an overall rectangular shape and has an open face 12 formed on one of its sides. The open face 12 is dimensioned to receive the lens 8, and allows access to the interior of the housing 2.

A shoulder 14 is formed on the interior surfaces of the housing 2 and protrudes slightly into the housing's interior. The shoulder 14 at least partially surrounds the open face 12, and is recessed interiorly from the open face 12. The shoulder 14 defines a seat for the lens 8.

Several locator posts 16 are positioned on the back inside surface 18 of the housing 2. These posts 16 extend into the housing's interior, and are used to position the socket assembly 6 within the housing. One of the posts 16 includes a narrow tip portion 20 formed on its free standing end.

A pair of hinge portions 22 extends from the lower, outside surface 24 of the housing 2. Each hinge portion 22 includes a bore 26 to receive a self-tapping screw 28.

Short protrusions 30 extend from the top and bottom inside surfaces, 32 and 34, respectively, of the housing 2. These protrusions 30 are spaced from the shoulder 14, and are used to retain the lens 8 in the housing 2.

A recessed area 36 is formed in the lower inside surface 34 of the housing 2. The recessed area 36, having a reduced thickness, can be conveniently removed by the assembler of the light to provide a cut-out. The cut-out receives wires 38 which connect the light to the brake lights of the automobile. Alternatively, an opening (not shown) may be pre-formed in the housing to permit the wires 38 to pass through the housing 2.

The mounting assembly 4 includes a mounting bracket 40. The bracket 40 is formed with a bottom plate 42 having a flat lower surface 44. Wire access holes 46 are formed through the thickness of the plate 42 to receive wires 38.

A hinge portion 48 extends upwardly from the top surface 50 of the plate 42. The hinge portion 48 mates cooperatively with the hinge portions 22 of the housing. More specifically, the hinge portion 48 of the bracket is fitted between the hinge portions 22 of the housing.

A bore 52 is formed in each opposite lateral side 54 of the bracket hinge portion 48. The bores 52 tightly receive the ends of the screws 28 protruding from the bores 26 formed in the housing hinge portions 22. Thus, the hinge portions of the bracket 40 and housing 2 and screws 28 define a hinge and pin arrangement about which the housing pivots.

The mounting assembly 4 also includes an adhesive pad 56. The pad 56 is positioned on the lower surface 44 of the plate 42. An exposed adhesive surface 58 of the pad 56 allows the light to be mounted directly on the rear window 60 of the automobile, as illustrated by FIG. 3.

Wire access holes 62 are formed in the pad 56. However, the holes 62 are not used when mounting the unit directly to the rear window 60.

A pedestal 64 is further included. The pedestal 64 is a block having an overall rectangular shape, or trapezoidal in cross-section with slightly tapered side walls 66. When the light is mounted on the rear shelf 68 of the automobile, as illustrated by FIG. 2, the pedestal 64 may be used to raise the light sufficiently above the shelf 68 to be in line with the rear window 60.

The pedestal 64 has a flat top surface 70. Wire access holes 72 are formed in the top surface 70. Also, a pair of bores 74 with countersunk openings 76 is formed in the top surface 70.

Self-tapping screws 78 are provided to secure the light to the rear shelf 68. The screws 78 are received by the pedestal bores 74 and are secured to the shelf 68 by nuts 80.

The housing 2 is mounted on the pedestal 64 by positioning the adhesive surface 58 of the pad against the top surface 70 of the pedestal, with the wire access holes 62 of the pad aligned with the access holes 72 of the pedestal.

The socket assembly 6 includes a socket 82 for receiving an incandescent lamp 84. Two wires 38 extend from the socket 82 and are provided for connecting the unit to the automobile's brake lights.

An L-shaped bracket 86 is used to mount the socket 82 to the rear inside surface 18 of the housing 2. The L-shaped bracket 86 is joined to the socket 82, and includes a leg 88 having an opening 90 formed therein. A screw 92 is received by the opening 90, and by an opening 94 formed in the rear inside surface 18 of the housing, to secure the socket 82 to the housing 2.

The socket assembly 6 also includes a reflector 96. The reflector 96 includes a back plate 98, and two side plates 100 which extend from opposite edges 102 of the back plate 98 at diverging angles.

The back plate 98 includes an extended portion 104. A hole 106 is formed in the extended portion 104, which receives screw 92.

A U-shaped opening 108 is formed in an edge 110 of the back plate opposite the extended porton 104. The U-shaped opening 108 receives the tip 20 of the locator post 16, and the extended portion 104 is received between two other locator posts 16.

Thus, the reflector 96 is positioned between the rear surface 18 of the housing and the bulb 84, and is spaced a predetermined distance from the bulb 84 by the socket bracket 86.

The surfaces 112 of the back plate 98 and side plate 100 adjacent the bulb may be mirrored, polished, or include a reflective coating. Light emitted by the bulb 84 is reflected by these surfaces 112 through the lens 8.

The lens 8 is dimensioned to be received by the open face 12 of the housing, with the peripheral edge 114 of the lens abutting the shoulder 14 of the housing. The lens 8 includes a lip 116 which at least partially surrounds the outer periphery of the lens. The lip 116 has a thickness which is less than or equal to the space provided between the shoulder 14 and the protrusions 30. The lip 116 allows the lens 8 to be snap-fitted between the shoulder 14 and the protrusions 30 and held in place. However, the lens can be readily removed to replace the bulb 84.

The lens 8 may include a light dispersive or focussing surface, such as the ribbed surface 118 illustrated by FIG. 1.

An anti-glare shield 10 is also provided. The shield 10 includes a main body 120 which has an overall rectangular shape conforming esthetically to the shape of the housing 2. However, it may be desirable to form the main body 120 with outwardly diverging opposite side walls 122. The outwardly diverging walls 122 will provide the light with an increased lateral field for radiating.

The shield body 120 defines a first open face 124 on one of its sides, and a second open face 126 on the side opposite the first face 124.

A flange 128 recessed inwardly from the outer surface 130 of the body 120 surrounds the first open face 124. The flange 128 is received by the housing's open face 12 so that the shield's open face 124 is adjacent the lens 8.

A pair of tabs 132 extend from opposite outer surfaces 130 of the shield body 120 and in the outward direction of the flange 128. Each tab 132 includes a hole 134. Screws 136 are received by the tab holes 134 and holes 138 formed in corresponding sides of the housing 2 to secure the shield 10 to the housing 2.

The shield 10 is adapted to be readily trimmed to conform to the angle of the rear window 60. The housing 2 is adjusted on the mounting assembly 4 so that the lens 8 is substantially vertical. The angle of the rear window 60 with respect to the vertical is then determined. The measured angle is transferred to the shield 10 by using a template or other means. The shield body 120 is then cut to shape so that its sides 122 conform at its second open face 126 to the slope of the window 60. This allows the light to be mounted with its shield 10 closely positioned to the window.

By including a shield 10, trimmed and positioned as disclosed above, glare normally associated with the reflection from the light on the back window is eliminated.

The collision avoidance light also includes a flexible trim 140. The trim 140 is a length of rubber or elastic material with a cross-sectional U-shape. The trim 140 is mounted on the edge 142 of the shield which surrounds the second open face 126. Although not absolutely necessary for proper operation, the trim 140 provides the light with a finished appearance after the shield is cut to shape, helps prevent rattles, and reduces the possibility of light reflection from the window back to the driver.

The collision avoidance light of the present invention is perfectly adaptable for assembly and installation by the owner of the automobile. After the unit is properly mounted, the owner merely has to connect one of the wires 38 to the automobile's ground connection, and the other wire 38 to either one of the automobile's rear brake lights (the ungrounded side thereof).

Although illustrative embodiments of the present invention have been described herein with reference to the accompanying drawing, it is to be understood that the invention is not limited to those precise embodiments, and that various other changes and modifications may be effected therein by one skilled in the art without departing from the scope or spirit of the invention.

What is claimed is:

1. A collision avoidance light for placement at the rear window of automotive vehicles, which comprises:
   a housing, the housing defining an open face;

a socket assembly, including a socket for removably mounting a light bulb, the socket assembly being mounted in the housing;

a lens detachably secured to the housing in juxtaposition with the open face; and an anti-glare shield mounted on the housing and at least partially surrounding the lens, the anti-glare shield including a main body defining a first open face adjacent the lens and a second open face opposite the first face, the main body being adapted at its second open face to be conformed to the shape of the window to allow the shield to be positioned closely thereto, so as to avoid light reflection by said window toward the vehicle front.

2. A collision avoidance light as defined by claim 1, which further includes a flexible trim mounted on the shield and surrounding the second open face.

3. A collision avoidance light as defined by claim 1, wherein the shield includes a flange surrounding the first open face, the flange being recessed inwardly from the outer peripheral surface of the shield and being received by the open face of the housing.

4. A collision avoidance light as defined by claim 1, wherein the shield body includes opposite sidewalls between the first and second open faces, the sidewalls being mutually divergent in the direction of the second open face.

5. A collision avoidance light as defined by claim 1, wherein the main body is adapted to be conformed to the shape of the window by trimming the main body.

* * * * *